July 25, 1967 W. C. MILLS 3,332,534
MATERIAL HANDLING DEVICE
Filed March 14, 1966 2 Sheets-Sheet 1
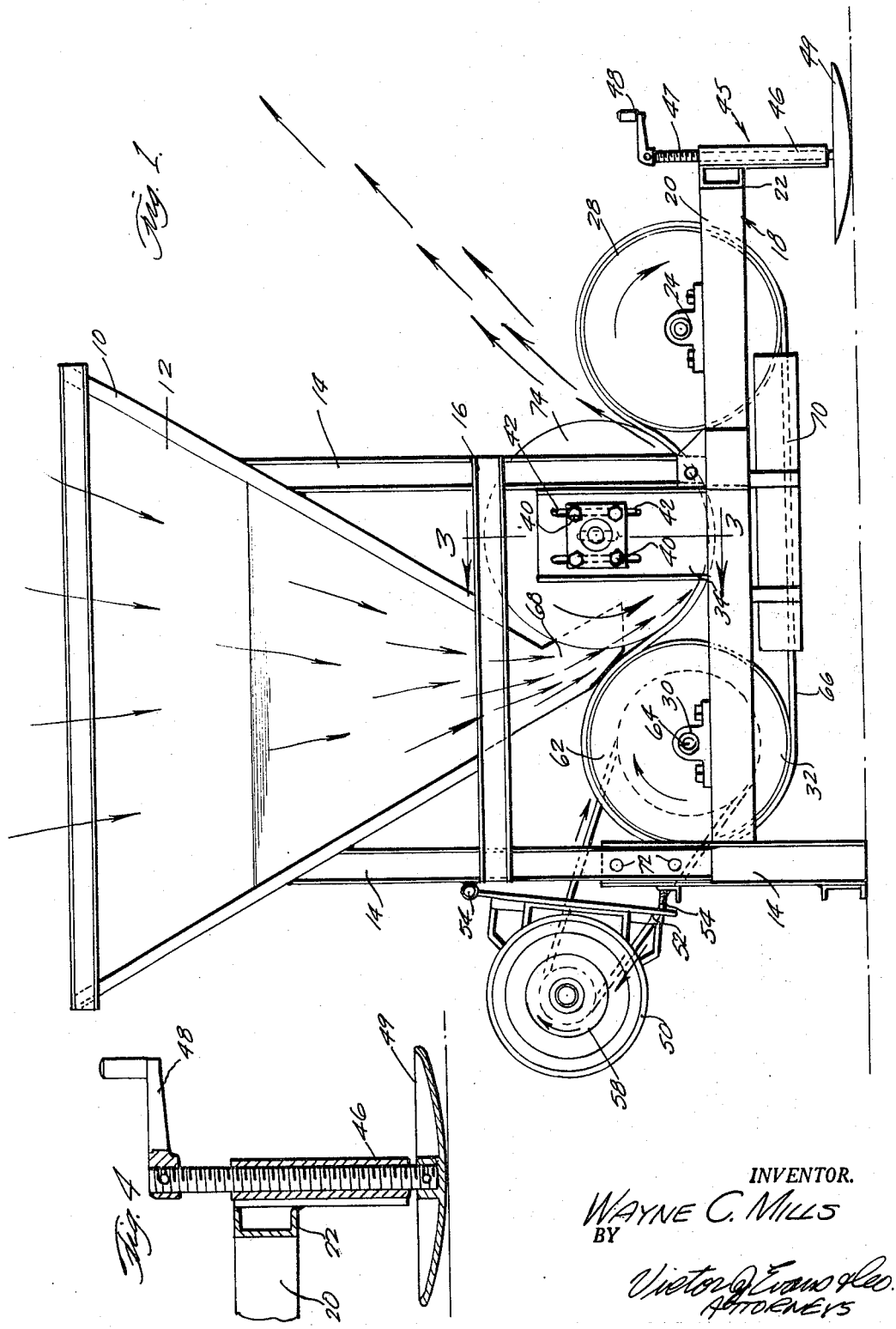
INVENTOR.
WAYNE C. MILLS
BY
Victor J. Evans & Co.
ATTORNEYS July 25, 1967 W. C. MILLS 3,332,534
MATERIAL HANDLING DEVICE
Filed March 14, 1966 2 Sheets-Sheet 2
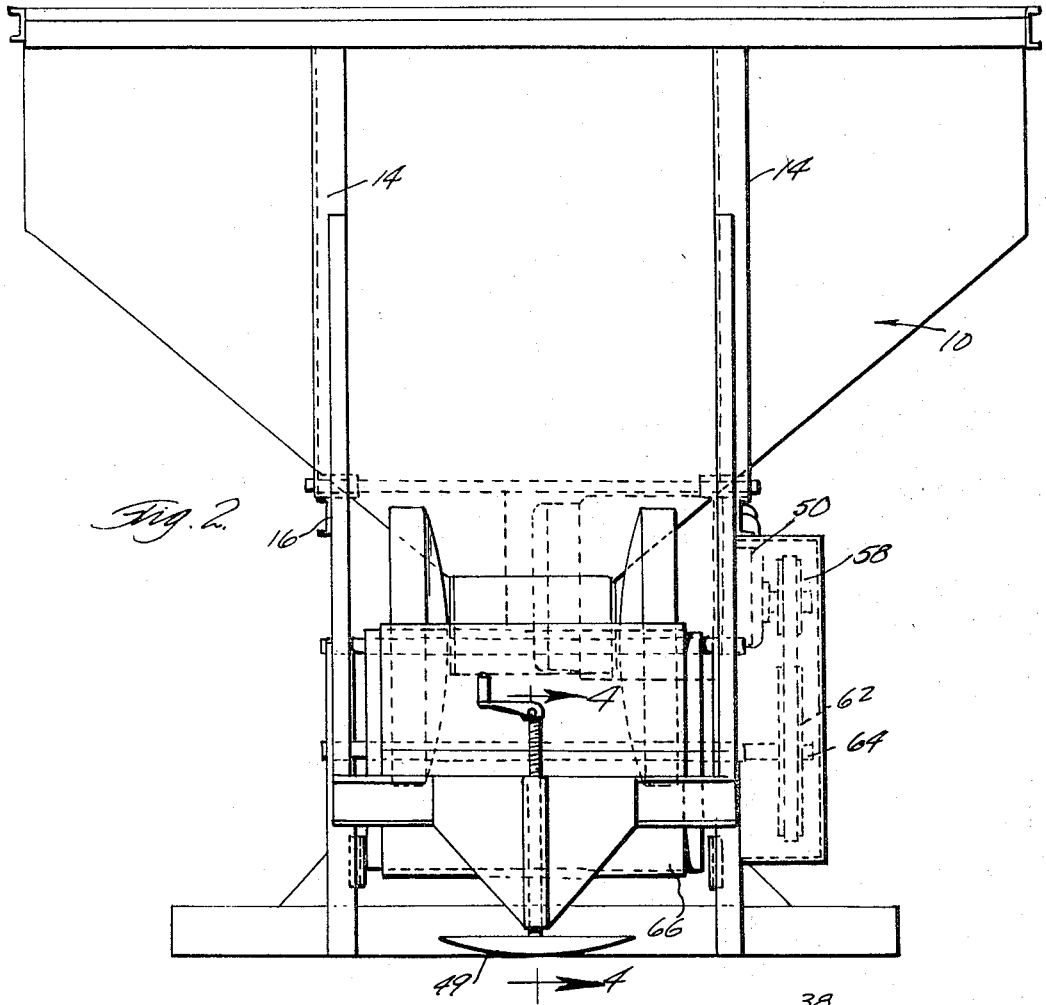
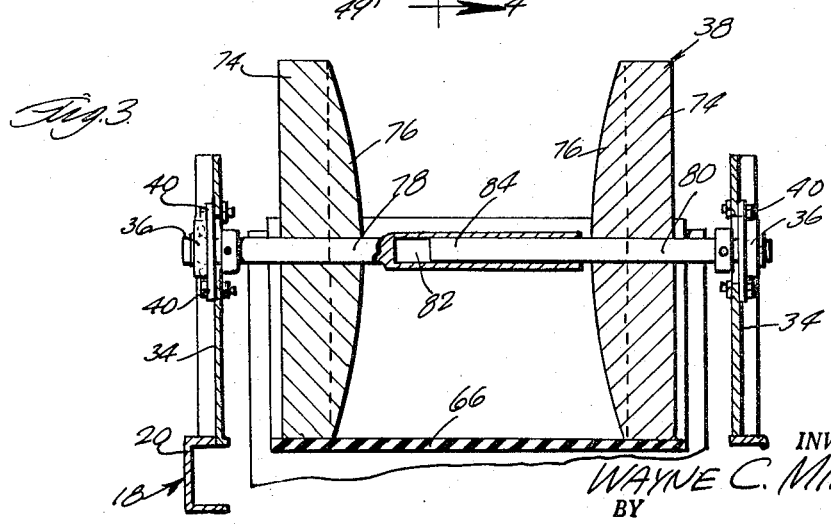
INVENTOR.
WAYNE C. MILLS
BY
Victor J. Evansko
ATTORNEYS

United States Patent Office 3,332,534
Patented July 25, 1967

3,332,534
MATERIAL HANDLING DEVICE
Wayne C. Mills, R.R. 4, Lebanon, Ind. 46052
Filed Mar. 14, 1966, Ser. No. 533,989
7 Claims. (Cl. 198—128)

ABSTRACT OF THE DISCLOSURE

Apparatus for material handling and more particularly to an apparatus of the thrower type for loading, or piling of loose or pulverized material and which consists of a hopper which deposits the pulverized material upon an endless belt and which is rotated by idler drums in order to discharge the said material in an air borne stream, and said idler drums are mounted upon a split shaft to allow either of the drums to rotate faster than the other so as to compensate for any misalignment condition.

---

The present invention relates to a material handling device and more particularly to an apparatus of the thrower type for loading or piling loose bulk material ranging from finely divided pulverized material to coarse material such as coal.

It is an object of the present invention to provide a material handling apparatus comprising a hopper means that discharges pulverized material on an endless belt means which rotates and discharges the material in an air borne stream.

It is an object of the present invention to provide a material handling apparatus in which idler drums are mounted on a split shaft to allow either drum to rotate faster than the other, so as to compensate for any misalignment condition.

It is another object of the present invention to provide a material handling apparatus that is light in weight, easy to handle, readily mobile and easy to control the directional flow due to an original disc like mount.

It is another object of the present invention to provide a material handling apparatus with a funnel type split shaft idler design.

It is another object of the present invention to provide a material handling apparatus that has few moving parts and is easily disassembled, and which apparatus is very adapable to the abrasive and erosive effects of fertilizer and other material that it is designed to handle.

It is another object of the present invention to provide a material handling apparatus that can stack material to a height of approximately thirty to forty feet and can have a handling capacity of approximately one ton per minute.

It is another object of the present invention to provide a material handling device provided with idler wheels or rollers that can automatically compensate for any misalignment condition due to the fact that they are free to accelerate or decelerate, as necessary, in order to preserve the alignment of the belt drive means.

Various other objects and advantages of the present invention will be readily apparent from the following detailed description when considered in connection with the accompanying drawings forming a part thereof and in which:

FIGURE 1 is a side elevation of the apparatus embodied in the present invention;

FIGURE 2 is a front elevational view of the apparatus shown in FIGURE 1;

FIGURE 3 is a section taken along line 3 of FIGURE 1; and

FIGURE 4 is a detailed view of the vertical adjusting front support embodied in the invention.

Referring to the drawings the reference numeral 10 generally designates a material handling device provided with a downwardly converging hopper 12 to which the bulk material is fed from a source not shown. The hopper 12 is supported by a plurality of spaced vertical standards or supports 14 secured to the outer surface of the hopper 12 by any suitable means. Horizontal I beams 16 are secured at their opposite ends to the vertical supports 14. The apparatus is provided with a lower platform or frame 18 consisting of two horizontal and parallel U shape beams 20 extending longitudinally of the apparatus and U shaped cross members 22, one of which can be seen in FIGURE 1.

The front end of the beam 20 carries bearings 24 for mounting a rotatable discharge drum 28. The rear end of the beams 20 is provided with bearings 30 for mounting a feeder drum 32 and its shaft thereon.

Disposed between the opposite ends of the beams 20 and approximately at the midpoint thereof are two vertical idler drum support members 34 which carry bearings 36 for mounting a pair of idler drums 38 thereon. The bearings 36 are connected to the support members 34 by bolts 40 disposed in vertical slot 42 in the supports 34. This enables the idler drum to be moved upwardly and downwardly and adjusted as desired.

The front end of the apparatus is provided with a vertical adjusting front support 45 consisting of an internally threaded sleeve 46 in which is disposed a screw jack 47 having a handle 48. The lower end of the screw jack 48 consists of a convex disc 49. Thus the front end of the support 45 can be raised or lowered by operating the handle 48 of the jack.

A drive motor 50 is mounted on a plate 52 that is pivotally connected at 54 to the rear of the vertical support members 14. The lower end of 52 can be adjusted with respect to the vertical support members 14 by a screw jack 54 of any well known construction. A drive sheave 58 is rotatably driven by the motor 50 and has a belt 60 carried by the driven sheave 62. The sheave 62 is fixed to the shaft 64 on which the feeder drum 32 is mounted for driving the feeder drum. An endless drive belt 66 is mounted on the feeder drum 32 and on the discharge drum 28. The endless belt rotates in the direction indicated by the arrows in FIGURE 1 so that material that is discharged through the opening 68 in the bottom of the hopper 12 is deposited on the endless belt and thrown in the direction indicated by the arrows in FIGURE 1 upwardly and above the front of the discharge drum 28. A belt guide 70 is also provided adjacent the bottom of the endless belt 66 and between the feed drum 32 and the discharge drum 28.

The height of the vertical support members 14 may be vertically adjusted by utilizing a plurality of horizontal bolt members 72 extending through the members 14 and the larger bottom vertical support member 72.

Referring to FIGURE 3 the idler drum 38 will be seen to consist of two spaced circular members 74 having a convex inner portion 76. The members 74 are disposed so that the left member 74 is fixed to the solid shaft 78 carried by the left bearing 36 while the right member 74 is fixed to another solid shaft 80 carried by the right bearing 36. It will be noted that the inner end of the solid shaft 78 is hollow and provides a sleeve 82 into which the inner end 84 of the shaft 80 extends. The portion of the shaft 84 is freely rotatable within the sleeve 82 so that the left and the right members 74 may accelerate or decelerate, or be rotated at different speeds with respect to one another. The members 74, as best seen in FIGURE 1 are in contact with the upper portion of the endless belt 66 so as to be driven by this belt. These members 74 are also disposed between the feed drum 32 and the discharge drum 28 and prevent any of the pulverized material being discharged through the opening 68 from dropping off the endless belt. In addition these funnel shaped split shaft idler rollers or members 74 increase the capacity of the apparatus since they tend to stop the roll back of the material under it. Also these idler wheels or rollers will automatically compensate for any misalignment condition due to the fact, that they are free to accelerate or decelerate, as necessary, in order to preserve the alignment of the belt.

Inasmuch as various changes may be made in the relative arrangement and location of the parts, it is to be understood that the invention is not to be limited except by the scope of the appended claims.

What is claimed is:

1. A material handling apparatus comprising a hopper with a discharge therein, a feeder drum and a discharge drum spaced from one another, belt means mounted on said feeder drum and discharge drum for rotating them, drive means for rotating the belt means, and idler means consisting of at least two disk members with one disk member disposed on a shaft having a hollow sleeve on one end thereof and the other disk member disposed on another shaft having a portion of said shaft extended into the hollow sleeve.

2. The device of claim 1 wherein said disc members consist of a circular outer portion and a convex inner portion facing one another.

3. The device of claim 2 wherein said discharge opening of said hopper is disposed between said idler disc members.

4. The device of claim 3 wherein vertical support means are provided for said disc member shafts and vertical adjustment means are disposed on said vertical support means.

5. The device of claim 4 wherein threaded sleeve means are provided for raising said material handling apparatus and consist of a threaded sleeve with a threaded screw jack disposed within said threaded sleeve, and a convex disc on said threaded member.

6. The device of claim 5 wherein said driving means consists of an electric motor and endless belt drive means connected to said feeder drum means.

7. The device of claim 6 wherein said electric motor is provided with means for adjusting the belt length of its belt drive means.

References Cited
FOREIGN PATENTS

| | | |
|---|---|---|
| 1,031,106 | 3/1953 | France. |
| 1,057,568 | 10/1953 | France. |
| 768,360 | 2/1957 | Great Britain. |

EVON C. BLUNK, *Primary Examiner.*

R. J. HICKEY, *Assistant Examiner.*